(12) United States Patent
Forstadius (10) Patent No.: US 7,339,939 B2
(45) Date of Patent: Mar. 4, 2008

(54) APPARATUS, METHOD AND SYSTEM FOR AN OBJECT EXCHANGE BRIDGE

(75) Inventor: Antti Forstadius, Tampere (FI)

(73) Assignee: Nokia Corporation, Espoo (FI)

( * ) Notice: Subject to any disclaimer, the term of this patent is extended or adjusted under 35 U.S.C. 154(b) by 737 days.

(21) Appl. No.: 09/896,635

(22) Filed: Jun. 29, 2001

(65) Prior Publication Data

US 2003/0002504 A1 Jan. 2, 2003

(51) Int. Cl.
*H04L 12/28* (2006.01)
*H04Q 7/00* (2006.01)

(52) U.S. Cl. .................. 370/401; 370/328; 370/465; 709/203

(58) Field of Classification Search ............ 709/203, 709/209; 370/328, 338, 352, 401, 465, 466
See application file for complete search history.

(56) References Cited

U.S. PATENT DOCUMENTS

| | | | | |
|---|---|---|---|---|
| 5,913,032 | A * | 6/1999 | Schwartz et al. ........... 709/213 |
| 6,446,127 | B1 * | 9/2002 | Schuster et al. ........... 709/227 |
| 6,574,678 | B1 * | 6/2003 | Nykanen et al. ............. 710/10 |
| 6,600,902 | B1 * | 7/2003 | Bell .......................... 455/41.2 |
| 6,633,761 | B1 * | 10/2003 | Singhal et al. ............... 455/436 |
| 6,778,834 | B2 * | 8/2004 | Laitinen et al. ............. 455/450 |
| 6,799,318 | B1 * | 9/2004 | Davison et al. ............. 719/322 |
| 6,828,986 | B2 * | 12/2004 | Sakashita et al. ........... 345/629 |
| 6,882,659 | B1 * | 4/2005 | Novak et al. ............... 370/466 |
| 6,973,333 | B1 * | 12/2005 | O'Neil ..................... 455/569.2 |
| 6,976,075 | B2 * | 12/2005 | Ma ............................ 709/228 |
| 2001/0051981 | A1 * | 12/2001 | Davison et al. ............. 709/203 |
| 2002/0012329 | A1 * | 1/2002 | Atkinson et al. ........... 370/330 |
| 2002/0022453 | A1 * | 2/2002 | Balog et al. .................. 455/41 |
| 2002/0094067 | A1 * | 7/2002 | August .................... 379/88.01 |
| 2002/0094777 | A1 * | 7/2002 | Cannon et al. ............... 455/41 |
| 2002/0123307 | A1 * | 9/2002 | Winarski ...................... 455/41 |
| 2002/0181415 | A1 * | 12/2002 | West et al. ................. 370/312 |
| 2002/0184385 | A1 * | 12/2002 | Kato .......................... 709/237 |
| 2002/0194266 | A1 * | 12/2002 | Brebner et al. ............. 709/203 |
| 2002/0194498 | A1 * | 12/2002 | Blight et al. ................ 713/201 |
| 2003/0165128 | A1 * | 9/2003 | Sisodia et al. .............. 370/338 |

FOREIGN PATENT DOCUMENTS

WO WO0028713 5/2000

OTHER PUBLICATIONS

Zhang Pei et al., "Bluetooth—The Fastest Developing Wireless Technology", State Key Lab on Microwave and Digital Communications, Tsinghua University, pp. 1657-1664, Aug. 2000 IEEE.

(Continued)

*Primary Examiner*—Chi Pham
*Assistant Examiner*—Ahmed Elallam
(74) *Attorney, Agent, or Firm*—Morgan & Finnegan, L.L.P.

(57) ABSTRACT

An apparatus, method and system to route object exchanges beyond clients and object exchange (OBEX) servers in close proximity with one another. The present disclosure further provides the ability to route OBEX communications across a communications network such as the Internet. The present disclosure also teaches that a bridge device may support both short range RF communications, such as Bluetooth, and TCP/IP communications. The present disclosure tracks and enables OBEX enabled clients to send and receive information far outside their immediate wireless transmission range to remote servers.

36 Claims, 6 Drawing Sheets

OTHER PUBLICATIONS

Markus Albrecht et al., "IP Services Over Bluetooth: leading the Way to a New Mobility", Local Computer Networks, 1999, Conference in Lowell, MA Oct. 18-20, 1999 IEEE, pp. 2-11.

Syncml web site, "SyncML OBEX Binding", http://www.syncml.org/docs/syncml, Jun. 2001 pp. 1-19.

Juzo Yoshida "Part 3 How To Read Standard Specification—It's Not Bluetooth If Interconnectivity Is Not Ensured", Nikkei Electronics, Dec. 13, 1999, No. 759, pp. 156-163.

* cited by examiner

501) Terminal starts OBEX client application
502) Terminal sets up Bluetooth connection to AP
503) Terminal uses SDP to check for OBEX server capability of AP
504) AP responds by SDP giving out parameters needed for GEOP profile
505) Terminal initiates protocols according to GEOP profile
506) RFCOMM Channel (serial cable emulation) is formed between Terminal and AP
507) AP assigns internally an IP address and binds it to the established RFCOMM handle.
508) AP establishes TCP/IP connection to remote OBEX server.
509) OBEX client in Terminal sends OBEX data over RFCOMM connection
510) AP Bridge receives data from RFCOMM and encapsulates it into TCP/IP packets (routes data from RFCOMM to TCP/IP socket)
511) Responses from remote OBEX terminal are received by AP Bridge corresponding TCP/IP socket and Bridge encapsulates it to RFCOMM packets (routes data from TCP/IP socket to RFCOMM handle)

Fig. 5a

S12) OBEX client in terminal receives data through RFCOMM channel

S13) steps 9,..,12 are repeated until the terminal disconnects RFCOMM link or Bluetooth link.

S14) AP Bridge terminates TCP/IP connection to remote server and releases assigned IP address.

APPARATUS, METHOD AND SYSTEM FOR AN OBJECT EXCHANGE BRIDGE

FIELD

The present invention relates generally to an apparatus, method and system to route information from a wireless device across a communications network. More particularly, the disclosed invention relates to an apparatus, method and system to enable short range radio frequency ("RF") wireless point to point communications to be bridged across a communications network.

BACKGROUND

Networks

Networks are commonly thought to consist of the interconnection and interoperation of clients, servers, and intermediary nodes in a graph topology. It should be noted that the term "server" as used herein refers generally to a computer, other device, software, or combination thereof that processes and responds to the requests of remote users across a communications network. Servers serve their information to requesting "clients." A computer, other device, software, or combination thereof that facilitates, processes information and requests, and/or furthers the passage of information from a source user to a destination user is commonly referred to as a "node." Networks are generally thought to facilitate the transfer of information from source points to destinations. There are many forms of networks such as Local Area Networks (LANs), Wide Area Networks (WANs), Pico networks, etc.

Internet

The Internet is a network of networks. It is an interconnection of various and disparate networks that are disposed in communication with one another. This interconnectivity and intercommunications provided by the Internet is in large part facilitated through the use of common transmission protocols.

As Internet usage increases, the amount of information and/or services available on the Internet also increases. This makes the Internet a valuable information transportation vehicle.

Transmission Control Protocol-Internet Protocol (TCP/IP)

The proliferation and expansion of computer systems, databases, and networks of computers has been facilitated by an interconnection of such systems and networks in an extraterritorial communications network commonly referred to as the Internet. The Internet has developed and largely employs the Transmission Control Protocol-Internet Protocol (TCP/IP). TCP/IP was developed by a Department of Defense (DoD) research project to interconnect networks made by various and varying network vendors as a foundation for a network of networks, i.e., the Internet. The development of TCP/IP was in part driven by a requirement by the DoD to have a network that will continue to operate even if damaged during battle, thus allowing for information to be routed around damaged portions of the communications network to destination addresses.

The Internet is a packet-switched network and thus, information on the Internet is broken up into pieces, called packets, and transmitted in packet form. The packets contain IP addressing information called headers, which are used by routers to facilitate the delivery of the packets from a source to a destination across intermediary nodes on the Internet. Upon arrival at the destination, the packets are reassembled to form the original message, and any missing packets are requested again.

The IP component of the protocol is responsible for routing packets of information based on a four byte addressing mechanism; the address is written as four numbers separated by dots, each number ranging from 0 to 255, e.g., "123.255.0.123". IP addresses are assigned by Internet authorities and registration agencies, and are unique.

The TCP portion of the protocol is used for verifying that packets of information are correctly received by the destination computer from the source, and if not, to retransmit corrupt packets. Other transmission control protocols are also commonly used that do not guarantee delivery, such as User Datagram Protocol (UDP). The TCP/IP protocol is specified in IEEE/RFC1190, January 1991.

Object Exchange (OBEX) Protocol

OBEX is a session protocol and can be described as a binary HTTP protocol. An example of an OBEX server implementation may be OpenOBEX, which may be found at the website: sourceforge.net/projects/openobex.

The OBEX protocol and specification may be found in: IrOBEX, IrDA Object Exchange Protocol, Counterpoint Systems Foundry, Inc., Microsoft Corporation, Mar. 18, 1999 (Version 1.2).

Bluetooth Protocol (BT)

Bluetooth is a wireless technology that operates in the unlicensed Industrial, Scientific, and Medical (ISM) radio band of 2.4 GHz. Bluetooth technology includes a number of protocols that allow Bluetooth enabled devices to operate in a peer to peer environment forming piconets.

The Bluetooth protocol and specification may be found in: Bluetooth system; Specification Volumes 1 and 2, Core and Profiles: Version 1.1, 22 Feb., 2001.

SUMMARY

One embodiment of the present invention solves the problem of allowing remote OBEX services to interact with clients that support Bluetooth GOEP profiles. This is a very useful feature when implemented in Bluetooth access point networks as the desired service can be accessed through any access point instead of having to connect directly to the server device.

In one embodiment of the present invention, the OBEX bridge apparatus comprises a processor; a memory, communicatively connected to the processor; a program, stored in the memory, including, a module to receive the OBEX encoded communications at a short range RF (e.g., Bluetooth) enabled OBEX bridge from an OBEX client, a module to determine a destination IP address to send the received OBEX encoded communications, and a module to send the received OBEX encoded communications from the short range RF enabled OBEX bridge to an OBEX server at the determined destination IP address via IP.

In another embodiment of the present invention, the OBEX bridge apparatus comprises a processor; a memory, communicatively connected to the processor; a program, stored in the memory, including, a module to obtain OBEX encoded communications, a module to establish a baseband communication channel using a Bluetooth GOEP profile between the OBEX client and a Bluetooth enabled OBEX bridge, a module to encapsulate the OBEX encoded communications into baseband communications, a module to provide the baseband encapsulated communications to the OBEX bridge, a module to assign an internal IP address within the OBEX bridge, a module to bind the IP address to the baseband communication channel, a module to establish a TCP/IP communication channel between the OBEX bridge and a remote OBEX server, and a module to route the OBEX encoded data from the baseband channel to the TCP/IP channel.

In another embodiment of the present invention, the OBEX bridge apparatus comprises a processor; a memory, communicatively connected to the processor; a program, stored in the memory, including, a module to create a client baseband handle referring to a memory space in an OBEX bridge's memory for incoming baseband communications, a module to create an internal IP address within an OBEX bridge allowing for communications to flow to and from a communications network through the IP address, a module to create an entry in the memory to store the client baseband handle data type, a module to create an entry in the memory to store the IP address data type, and a module to bind the client baseband handle data type with its respective IP address data type.

In yet another embodiment of the present invention, the OBEX bridge apparatus comprises a processor; a memory, communicatively connected to the processor; a program, stored in the memory, including, a module to receive at an OBEX bridge OBEX encoded communications transmitted from the OBEX client via short range radio link; a module to allocate an internal address to the OBEX client at the OBEX bridge; a module to associate the OBEX client with the allocated internal address at the OBEX bridge; a module to select a certain OBEX server at the OBEX bridge to send the received OBEX encoded communications; a module to determine a destination IP address of the selected OBEX server; a module to send the received OBEX encoded communications from the OBEX bridge to the selected OBEX server via IP.

The above advantages and features are of representative embodiments only, and are not exhaustive and/or exclusive. They are presented only to assist in understanding the invention. It should be understood that they are not representative of all the inventions defined by the claims, to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The accompanying drawings illustrate certain embodiments of the disclosure.

DETAILED DESCRIPTION

Short Range RF Enabled Client Terminal

Figure 1:
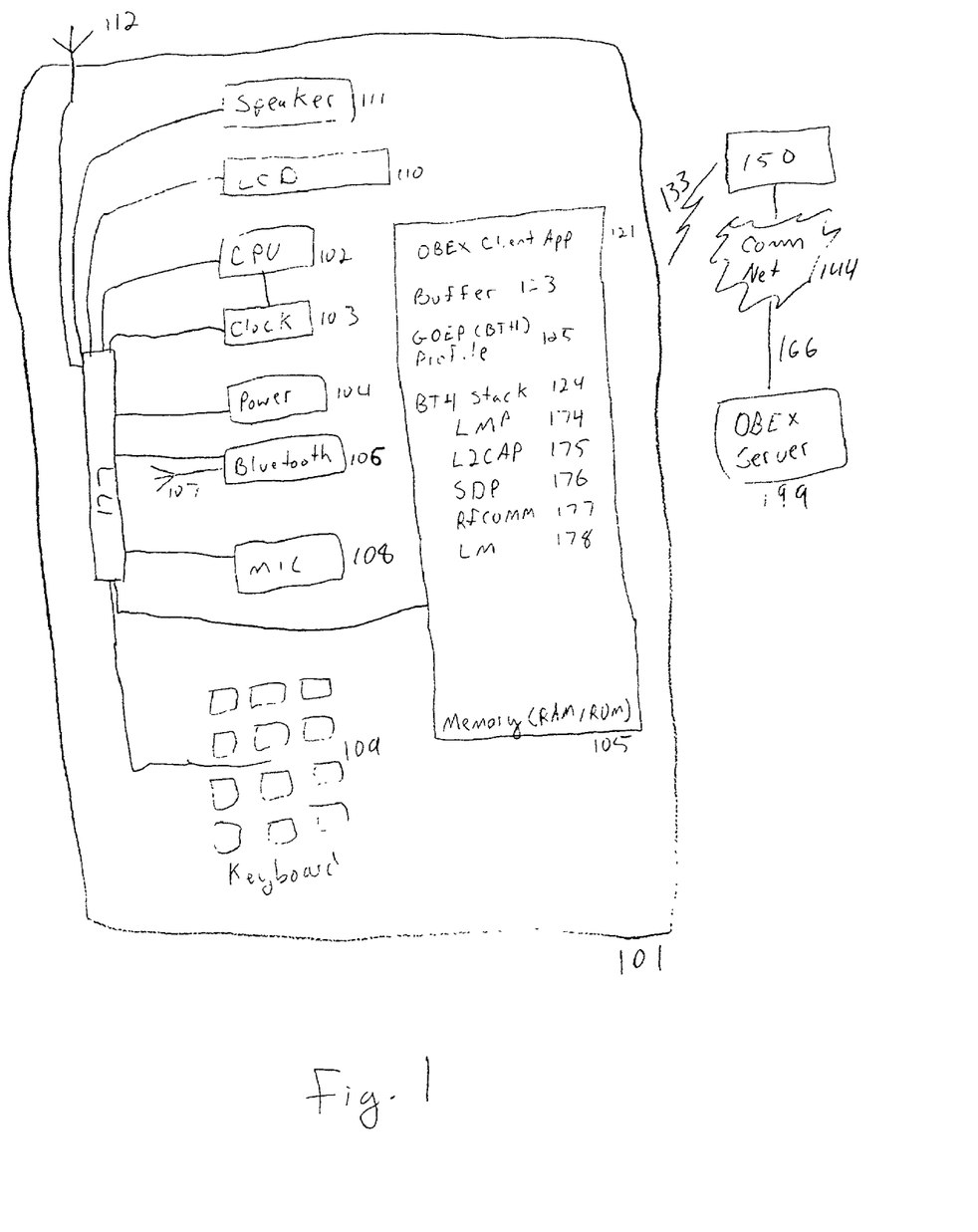
FIG. 1 is a schematic overview of a short range RF enabled and object exchange (OBEX) enabled client terminal according to one embodiment of the present invention.

FIG. 1 is a schematic overview of a short range RF and object exchange (OBEX) enabled client terminal (hereinafter called a "client") according to one embodiment of the invention.

Client Systemization

In one non-limiting example embodiment, the client 101 may comprise a clock 103, central processing unit (CPU) 102, a memory 105, a power source 104, input 108, 109 and output 110, 111 (I/O) components 112, 106, 107. The power source 104 provides power to the client. One of the I/O components is preferably a Bluetooth chip 106 such as Cambridge Silicon Radio Inc.'s BlueCore IC and Bluetooth transceiver 107 capable of transmitting and receiving Bluetooth protocol communications. It is to be understood that the use of Bluetooth components/protocols in the exemplary embodiment is intended to be illustrative rather than limiting, and that therefore other short range radio frequency technologies may alternatively be employed. Optionally, the client may also employ other wireless protocol transceivers 112 such as those employed for cellular telecommunications. Conventionally, although not necessarily, the client components are all interconnected and/or communicating through a system bus 177. The system clock 103 typically has a crystal oscillator and provides a base signal. The clock is typically coupled to the system bus and various means that will increase or decrease the base operating frequency for other components interconnected in the client. The clock and various components in the client drive signals embodying information throughout the client. Such transmission and reception of signals embodying information throughout the client may be commonly referred to as communications. These communicative signals may further be transmitted, received, and the cause of return and/or reply signal communications beyond the instant client to: communications networks, input devices, computer systems (e.g., servers), bridges, other clients, peripheral devices, and/or the like. Of course, any of the above components may be connected directly to one another, connected to the CPU, and/or organized in numerous variations employed as exemplified by various wireless and short range RF enabled devices such as, but not limited to: cellular telephones, Portable Digital Assistants (PDAs), laptop computers, and/or the like. Optionally the client may include various input/output devices, which are also disposed in communication with the CPU through the system bus and/or directly. Such input devices may include a microphone 108, an input keypad 109, a touch sensitive screen (not shown), and/or like. Output devices may include an LCD 110 and a speaker 111.

CPU

The CPU 302 comprises at least one data processor adequate to execute program modules for executing user and/or system-generated requests. The CPU may be a microprocessor such as the Intel Pentium Processor and/or the like. The CPU interacts with memory through signal passing through conductive conduits to execute stored program code according to conventional data processing techniques. Such signal passing facilitates communication within the communication networks and beyond through various interfaces.

Memory

It is to be understood that the client may employ various forms of memory 105. In a typical configuration, memory 105 will include ROM, RAM, and possibly a fixed storage device, e.g., a hard disk drive. Also, the Bluetooth chip 106 may contain various Bluetooth protocols within its own memory that may be provided to either the CPU 102 and/or memory 105. Generally, any mechanization and/or embodiment allowing a processor to affect the storage and/or retrieval of information is regarded as memory 105. Thus, a client generally requires and makes use of memory. However, memory is a fungible technology and resource, thus, any number of memory embodiments may be employed in lieu of or in concert with one another.

Module Collection

The memory 105 may contain a collection of program modules and/or data such as, but not limited to: an operating system module (operating system); an OBEX client application 121; Generic Object Exchange Profile(s) (GOEP), which may also serve as a Bluetooth profile; memory buffers 123; cellular communication protocols; Bluetooth protocol stack 124, other short range radio frequency protocols and/or the like. Bluetooth protocol stack may include a link manager protocol (hereinafter "LMP") 174, a Logical Link Control and Application Protocol (L2CAP) 175, a Service Discovery Protocol (SDP) 176, RFCOMM 177 (i.e., a serial line emulation protocol), and/or the like. Although non-conventional software modules such as those in the module collection, typically and preferably, are stored in memory 105, they may also be loaded and/or stored in memory such as: peripheral devices, ROM, remote storage facilities through a communications network, various forms of memory, and/or the like.

Operating System

The operating system module is executable program code facilitating the operation of the client. Typically, the operating system facilitates access of I/O, network interfaces, peripheral devices, storage devices, and/or the like. The operating system also may provide user interface functionality allowing the user to interact with the client. An exemplary client operating system is Linux. An operating system may communicate to and/or with other modules in a module collection, including itself, and/or facilities of the like. Conventionally, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. Preferably, the operating system provides communications protocols that allow the client to communicate with other entities through a communications network 144. Various communication protocols may be used by the client as a subcarrier transport mechanism for interacting with other short range RF enabled devices, such as, but not limited to: TCP/IP 122, Bluetooth (i.e., via RFCOMM), OBEX 121, and/or the like.

Bluetooth Protocols

In memory 105 various Bluetooth protocols 124 and/or other short range RF protocols are stored. The Bluetooth protocols may include a link manager protocol 174 (hereinafter "LMP"). The link manager software runs on the CPU in the client to manage communications between itself and other Bluetooth devices. Another protocol is the Service Discovery Protocol 176 (hereinafter "SDP"). After the connection of a Bluetooth client with another device, the Service Discovery Protocol enables the querying and identification of the abilities of other Bluetooth devices. Another protocol is the Logical Link Control and Adaptation Protocol 175 (hereinafter "L2CAP"). The L2CAP provides multiplexing, packet segmentation and reassembly of data as it's communicated between the client and other Bluetooth enabled devices. Another protocol held in memory 105 is the RFCOMM which is a serial line emulation protocol that enables Bluetooth devices to intercommunicate by emulating a serial line. These various protocols interact to encode and decode data as given by the CPU through a base band 107. LMP and L2CAP run directly on top of base band 107. RFCOMM and SDP run on top of L2CAP.

Furthermore, within the RAM 105 is an Object Exchange (hereinafter "OBEX") client application 121. The client application creates OBEX requests based on user input into the client device and receives and interprets OBEX responses from an OBEX server 199. OBEX is a session layer protocol that was developed to enable the exchange of objects in a simple and spontaneous manner. OBEX enables object exchange services similar to HTTP used in the World Wide Web (the web), however, OBEX requires substantially less resources to run. The OBEX client application enables the client to exchange objects and to communicate over the RFCOMM. Further, the memory may contain a Generic Object Exchange Profile (hereinafter "GOEP" or "Profile") 125. GOEP specifies a manner in which Bluetooth devices may support object exchange facilities including File Transfer Profile, Object Push Profile and Synchronization Profile. The GOEP specification allows Bluetooth devices to interoperate by defining interoperability requirements for the applications and the higher Bluetooth protocol layers (i.e., L2CAP, RFCOMM, etc.). Furthermore, the memory 105 may provide an area that will act as a buffer 123.

The Client 101 may communicate through communications network 144 wirelessly 133 to eventually reach an OBEX server 199. This is facilitated by an OBEX bridge 150.

OBEX Bridge for Short Range RF Communications

Figure 2:
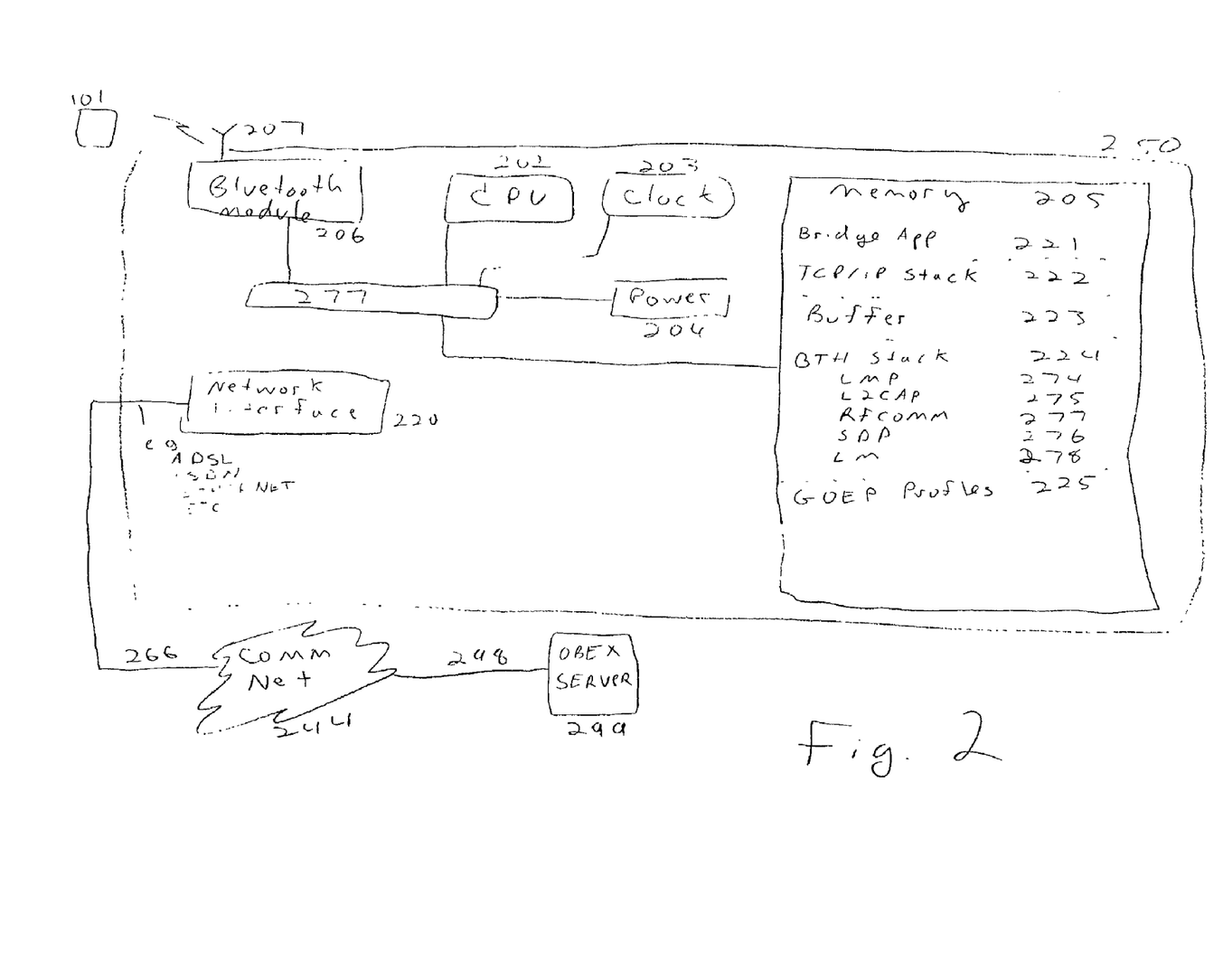
FIG. 2 details the schematic overview of a short range RF enabled OBEX bridge according to one embodiment of the present invention.

FIG. 2 details the schematic overview of a short range RF enabled OBEX bridge (hereinafter "bridge") according to one embodiment of the invention.

OBEX Bridge Systemization

In one non-limiting example embodiment, the bridge 250 may comprise a clock 203, central processing unit (CPU) 202, a memory 205, a power source 204, I/O components 220, 207. The power source 204 provides power to the bridge. One of the I/O components is a Bluetooth chip 206 such as Cambridge Silicon Radio Inc.'s BlueCore IC and Bluetooth transceiver 207 capable of transmitting and receiving Bluetooth protocol communications. As discussed above in connection with "Client Systemization" (FIG. 1), the use of Bluetooth components/protocols in the exemplary embodiment is intended to be illustrative rather than limiting, and that therefore other short range RF technologies may alternatively be employed. Conventionally, although not necessarily, the bridge components are all interconnected and/or communicating through a system bus 277. The system clock 203 typically has a crystal oscillator and provides a base signal. The clock is typically coupled to the system bus and various means that will increase or decrease the base operating frequency for other components interconnected in the bridge. The clock and various components in the bridge drive signals embodying information throughout the bridge. Such transmission and reception of signals embodying information throughout the bridge may be commonly referred to as communications. These communicative signals may further be transmitted, received, and the cause of return and/or reply signal communications beyond the instant bridge to: communications networks, input devices, computer systems (e.g., servers), peripheral devices, clients, and/or the like. Of course, any of the above components may be connected directly to one another, connected to the CPU, and/or organized in numerous variations employed as exemplified by various short range RF enabled computing devices. Optionally the bridge may include various input/output devices, which are also disposed in communication with the CPU through the system bus and/or directly. The Bluetooth module 206 enables wireless communications through a wireless transceiver 207, while a network interface 220 such as an Ethernet card, an ISDN card, a DSL card, and/or the like enables communications 266 with the communications network 244. Thus, the bridge 250 bridges short range RF wireless communications, 207 with network communications 220, 266, 244.

CPU

The CPU 202 comprises at least one data processor adequate to execute program modules for executing user and/or system-generated requests. The CPU may be a microprocessor such as the Intel Pentium Processor and/or the like. The CPU interacts with memory through signal passing through conductive conduits to execute stored program code according to conventional data processing techniques. Such signal passing facilitates communication within the communication networks and beyond through various interfaces.

Memory

It is to be understood that the bridge may employ various forms of memory 205. In a typical configuration, memory 205 will include ROM, RAM, and possibly a fixed storage device, e.g., a hard disk drive. Also, the Bluetooth chip 206 may contain various Bluetooth protocols within its own memory that may be provided to either the CPU 202 and/or memory 205. Generally, any mechanization and/or embodiment allowing a processor to affect the storage and/or retrieval of information is regarded as memory 105. Thus, a bridge generally requires and makes use of memory. However, memory is a fungible technology and resource, thus, any number of memory embodiments may be employed in lieu of or in concert with one another.

Module Collection

The memory 205 may contain a collection of program modules and/or data such as, but not limited to: an operating system module (operating system); an OBEX bridge application 221; TCP/IP stack 222; Generic Object Exchange Profile(s) (GOEP), which may also serve as a Bluetooth profile; memory buffers 223; cellular communication protocols; Bluetooth protocol stack 224, other short range RF protocols, and/or the like. Bluetooth protocol stack may include a Link Manager protocol (LM) 274, a Logical Link Control and Application Protocol (L2CAP) 275, a Service Discovery Protocol (SDP) 276, RFCOMM 177 (i.e., a serial line emulation protocol), and/or the like. Although non-conventional software modules such as those in the module collection, typically and preferably, are stored in memory 205, they may also be loaded and/or stored in memory such as: peripheral devices, ROM, remote storage facilities through a communications network, various forms of memory, and/or the like.

Operating System

The operating system module is executable program code facilitating the operation of the bridge. Typically, the operating system facilitates access of I/O, network interfaces, peripheral devices, storage devices, and/or the like. The operating system also may provide user interface functionality allowing an administrator to interact with the bridge. An exemplary bridge operating system is Linux. An operating system may communicate to and/or with other modules in a module collection, including itself, and/or facilities of the like. Conventionally, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. Preferably, the operating system provides communications protocols that allow the client to communicate with other entities through a communications network 244. Various communication protocols may be used by the bridge as a subcarrier transport mechanism for interacting with other short range RF enabled devices, such as, but not limited to: Bluetooth (i.e., via RFCOMM), multicast, OBEX 221, TCP/IP 222, UDP, unicast, and/or the like. The TCP/IP stack enables TCP/IP communications through the network interface 220.

Bluetooth Protocols

In memory 205 various Bluetooth protocols 224 and/or other short range RF protocols are stored. The Bluetooth protocols may include a LM protocol 274, SDP 276, L2CAP 275, RFCOMM 277, and Baseband as has already been discussed above. The link manager software runs on the CPU in the bridge to manage communications between itself and other Bluetooth devices such as clients 101. After the connection of the Bluetooth bridge with another device, the Service Discovery Protocol enables the querying and identification of the abilities of other Bluetooth devices. These various protocols interact to encode and decode data as given by the CPU through a base band 207. LM and L2CAP run directly on top of base band 207. RFCOMM and SDP run on top of L2CAP.

Furthermore, within the memory 205 is an OBEX bridge application 221. The bridge application obtains information from OBEX clients 101 and further relays them to OBEX servers 299.

The OBEX bridge 250 communicates via the Bluetooth transceiver 207 with a client 101 wirelessly 233. Furthermore, the OBEX bridge, via the network interface 220, is disposed in communication 266 with a communications network 244 which enables communications 298 with an OBEX server 299.

OBEX Server

Figure 3:
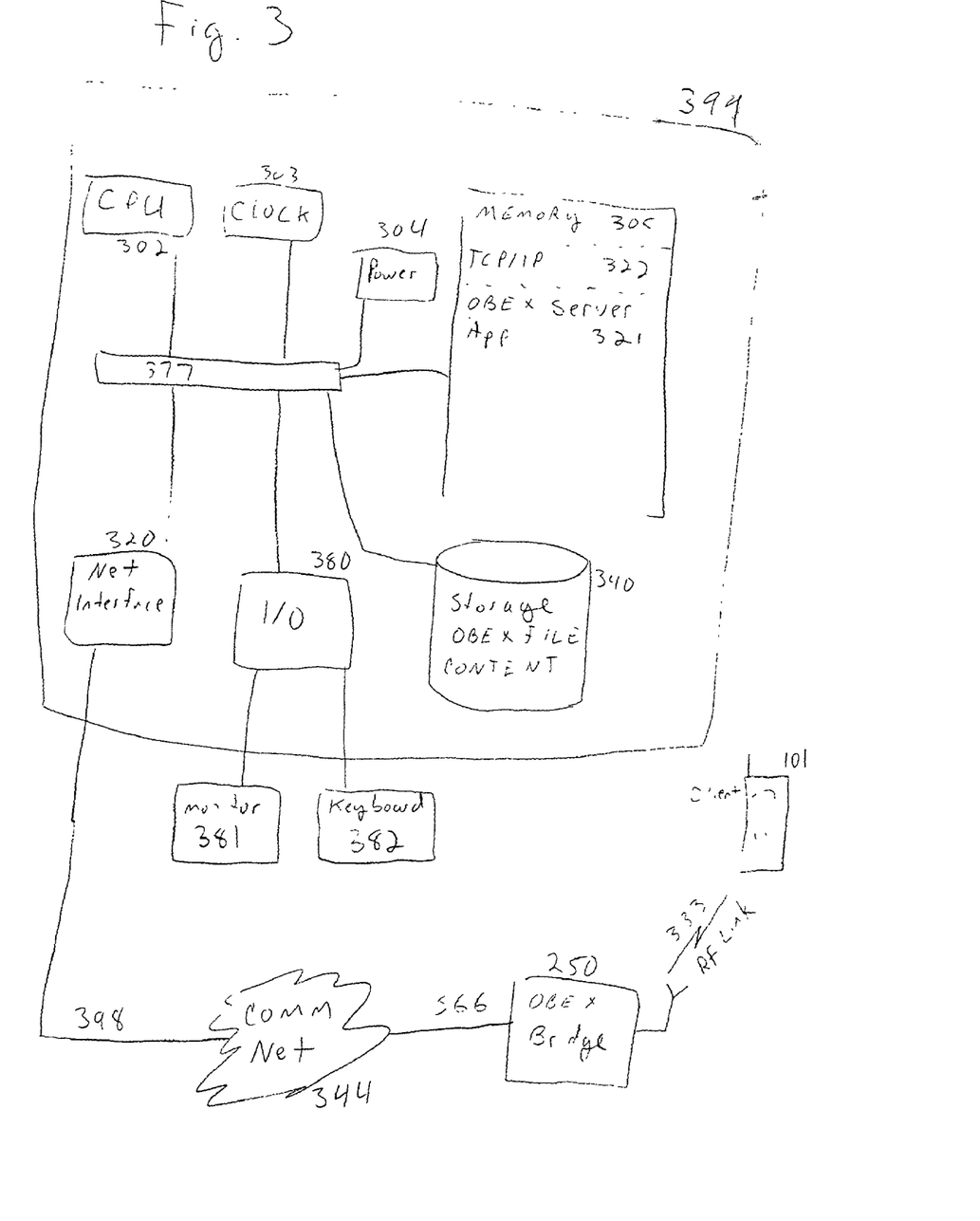
FIG. 3 is a schematic overview of an OBEX server according to one embodiment of the present invention.

FIG. 3 is a schematic overview of an OBEX server according to one embodiment of the invention.

OBEX Server Systemization

In one non-limiting example embodiment, the OBEX server 399 may comprise a clock 303, central processing unit (CPU) 302, a memory 305, a power source 304, I/O components 380, 381, 382, 320. The power source 304 provides power to the OBEX server. The I/O interface 380 may be any number of busses that allow for the interconnection of peripheral and input output devices, such as, but not limited to a keyboard 382, a monitor 381, a network interface 320, and/or the like. Conventionally, although not necessarily, the server components are all interconnected and/or communicating through a system bus 377. The system clock 303 typically has a crystal oscillator and provides a base signal. The clock is typically coupled to the system bus and various means that will increase or decrease the base operating frequency for other components interconnected in the bridge. The clock and various components in the server drive signals embodying information throughout the server. Such transmission and reception of signals embodying information throughout the server may be commonly referred to as communications. These communicative signals may further be transmitted, received, and the cause of return and/or reply signal communications beyond the instant bridge to: communications networks, input devices, other computer systems (e.g., servers), peripheral devices, bridges, and/or the like. Of course, any of the above components may be connected directly to one another, connected to the CPU, and/or organized in numerous variations employed as exemplified by various computer systems and servers. Optionally the bridge may include various input/output devices, which are also disposed in communication with the CPU through the system bus and/or directly. The network interface 320 may be an Ethernet card, an ISDN card, a DSL card, and/or the like enabling communications 398 with the communications network 344.

CPU

The CPU 302 comprises at least one data processor adequate to execute program modules for executing user and/or system-generated requests. The CPU may be a microprocessor such as the Intel Pentium Processor and/or the like. The CPU interacts with memory through signal passing through conductive conduits to execute stored program code according to conventional data processing techniques. Such signal passing facilitates communication within the communication networks and beyond through various interfaces.

Memory

It is to be understood that the OBEX server may employ various forms of memory 305. In a typical configuration, memory 305 will include ROM, RAM, and a fixed storage device 340, e.g., a hard disk drive. Generally, any mechanization and/or embodiment allowing a processor to affect the storage and/or retrieval of information is regarded as memory 305. Thus, an OBEX server generally requires and makes use of memory. However, memory is a fungible technology and resource, thus, any number of memory embodiments may be employed in lieu of or in concert with one another.

Module Collection

The memory 305 may contain a collection of program modules and/or data such as, but not limited to: an operating system module (operating system); an OBEX server application 321; TCP/IP stack 322; and OBEX file content 341, which may be stored in the storage device 340 and retrieved into memory 305 as needed. The OBEX server application.

OBEX Server Application

An OBEX Server Application module 321 is stored program code that is executed by the CPU. The OBEX server may be a conventional OBEX information server such as, but not limited to, OpenOBEX. Optionally, the information server allows for the execution of program modules through facilities such as C++, Java, JavaScript, ActiveX, Common Gateway Interface (CGI) scripts, Active Server Page (ASP), and/or the like. Execution of these program modules in general is required in order to produce dynamic content (equivalent to use as in web servers). Optionally, the information server supports secure communications protocols such as, but not limited to, File Transfer Protocol (FTP); HyperText Transfer Protocol (HTTP); Object Exchange (OBEX) protocol, Secure Hypertext Transfer Protocol (HTTPS), Secure Socket Layer (SSL), and/or the like. Conventionally, an OBEX server provides results in the form of exchange objects, and allows for the manipulated generation of exchange objects through interaction with other program modules. An OBEX server may communicate to and/or with other modules in a module collection, including itself, and/or facilities of the like. Most frequently, the OBEX server communicates with operating systems, other program modules, user interfaces, and/or the like. An information server may contain, communicate, generate, obtain, and/or provide program module, system, user, and/or data communications, requests, and/or responses.

Operating System

The operating system module is executable program code facilitating the operation of the OBEX server. Typically, the operating system facilitates access of I/O, network interfaces, peripheral devices, storage devices, and/or the like. The operating system also may provide user interface functionality allowing an user to interact with the bridge. The operating system preferably is a conventional product such as Apple Macintosh OS X Server, AT&T Plan 9, Microsoft Windows NT Server, Unix, and/or the like operating systems. Preferably, the operating system is highly fault tolerant, scalable, and secure. An operating system may communicate to and/or with other modules in a module collection, including itself, and/or facilities of the like. Conventionally, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. Preferably, the operating system provides communications protocols that allow the client to communicate with other entities through a communications network 344. Various communication protocols may be used by the bridge as a subcarrier transport mechanism for interacting with other devices, such as, but not limited to: multicast, OBEX 321, TCP/IP 322, UDP, unicast, and/or the like. The TCP/IP stack enables TCP/IP communications through the network interface 320.

The OBEX server is disposed in communication 398 with a communications network 344 via the network interface 320. This enables communications 366 with the OBEX bridge 250 which is further disposed in communication 333 with an OBEX client 101.

OBEX Client-Bridge-Server Connection

Figure 4:
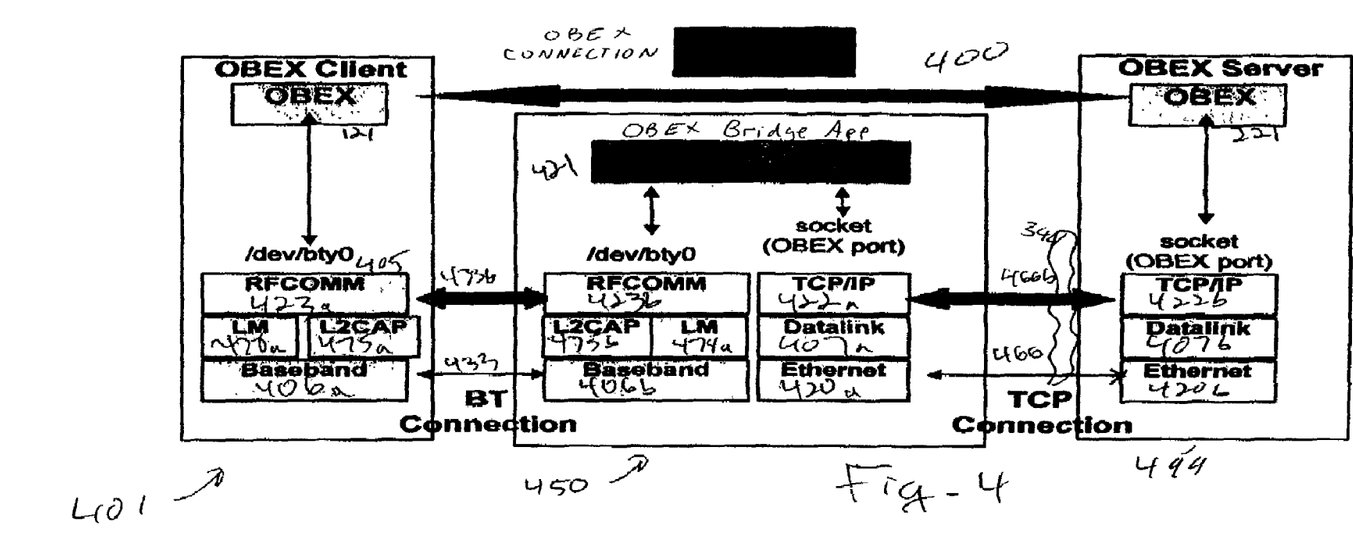
FIG. 4 shows an OBEX client-server-bridge connection 400 according to one embodiment of the present invention, and provides an exemplary data flow diagram.

FIG. 4 shows an OBEX client-server-bridge connection 400 according to one embodiment of the invention and provides an exemplary data flow diagram. The data flows are between an OBEX client 401, an OBEX bridge 450 and an OBEX server 499. The OBEX client has come within proximity of OBEX bridge 450 to establish a short range RF communication connection 433, such as Bluetooth, via the BaseBand 406. The OBEX client is running an OBEX client application 121. The OBEX client application creates certain data requests in OBEX format. Those requests are processed by the client's CPU employing short range RF protocols, such as Bluetooth, into RFCOMM data blocks 423a. The Link Manager 428a and the L2CAP 475a help take the RFCOMM encoded OBEX communications and provide those as data to a Baseband transceiver 406*a* which will communicate via Bluetooth protocols to an OBEX bridge 450 by establishing a connection to the OBEX bridge's Baseband transceiver 406*b*. The received data signals follow an inverse route in the OBEX bridge; the RF communications received from the OBEX client 401 by the OBEX bridge 450 in the OBEX bridge's Baseband facility 406*b* are then decoded by the LM 478*b* and the L2CAP 475*b* up into a serial data format via the RFCOMM 423*b* resulting in the original OBEX communication from the client 401.

For each OBEX client establishing a connection 433, the OBEX bridge 450 creates a handle to the communications being provided via RFCOMM 423*b* channel (typically the handle is a pointer that references an area of memory of a memory buffer 223) and assigns and associates an internal, unique IP address to that handle. Thus, the OBEX bridge creates and maintains a table data-structure of at least two columns (bridge table) 489 comprising a handle to an RFCOMM channel established from a client communication connection (client RFCOMM handle) 487 and an associated, generated, internal IP address (client IP address) 488. The bridge table may be implemented using various standard data structures, such as an array, hash, (linked) list, struct, and/or the like. Such data structures may be stored in memory and/or in (structured) files.

The OBEX bridge application 421 then obtains the OBEX data request that was originally generated by the client 121 by way of client RFCOMM handles (for data obtained from a particular client 401). Upon obtaining the OBEX data request from the memory buffer, the OBEX bridge application 421 then encapsulates the OBEX data request into TCP/IP packets. These packets are then sent to a TCP/IP layer 422*a*, which further provides the TCP/IP communications as a data link 407*a*, which is eventually sent over a physical carrier medium such as Ethernet 420*a*. When generating the TCP/IP packet headers, the OBEX bridge stamps the originating IP address as being the client IP address 488 that was generated and associated with a particular client RFCOMM handle 487; the OBEX bridge application may do so by looking to the bridge table 489. When determining the destination IP address for the OBEX data request, the OBEX bridge application 421 may consult an internal OBEX server lookup list. This lookup list is comprised of IP addresses. The list may contain a single entry, or a plurality of IP addresses. The choice of which OBEX server is chosen from the lookup list may be governed by any number of load balancing and/or context sensitive heuristics. For example, based on the client's GOEP profile and OBEX server specializing in File Transfer Profile, Object Push Profile or Synchronization Profile may be specified. In another non-limiting example embodiment, an OBEX server with the lowest usage load may be employed. The look-up list may be implemented using various standard data structures, such as an array, hash, (linked) list, struct, and/or the like. Such data structures may be stored in memory and/or in (structured) files. Upon stamping the origination and destination IP addresses in the resulting TCP/IP packets, the TCP/IP communications from the OBEX bridge are communicated 466 by the OBEX bridges network interface 420*a*. The OBEX communications from the OBEX bridge 421 are then communicated 466 over a communications network 344 to a network interface 420*b* on the OBEX server 499. Those communications are in turn provided to the data link 407*b* of the OBEX server 499 and provided in the form of TCP/IP packets 422*b*, which are then interpreted by the OBEX server application software 221. The OBEX server application 221 then can process the OBEX encoded data and requests and provide back results and responses to the client 401 via the bridge 450. Thus, the OBEX response signal from the OBEX server application 221 take the inverse path by which it originated.

Thus, the connection between an OBEX client and an OBEX bridge 433 that occur via Baseband 406 RF signals are provided by a conceptual RFCOMM channel 423, 433*b*. Furthermore, the TCP connection between the OBEX bridge and OBEX server 466 that occur via network interfaces 420 and a communications network 344 are provided by a conceptual TCP/IP connection 466*b*. Thus, the RFCOMM channel between the client and bridge plus the TCP/IP connection between the bridge and server create a conceptual OBEX connection 400. It's important to note that this OBEX connection can take place over a communications network and the OBEX server does not have to be placed in proximity with the OBEX client, rather communications can take place through the OBEX bridge through a communications network such as the Internet.

OBEX Server

Figure 5A:
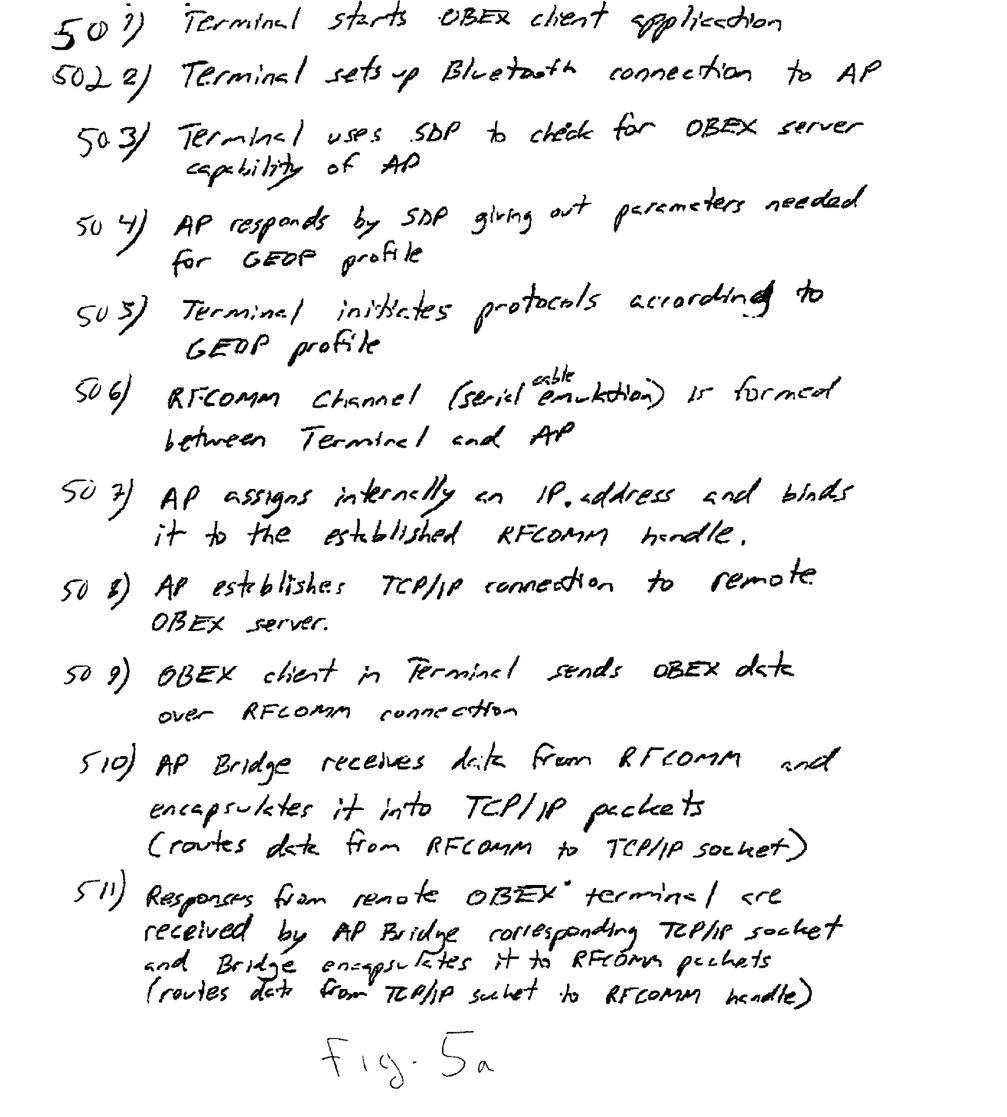
FIG. 5 details a flow diagram of an exemplary communications flow between an exemplary OBEX client, OBEX bridge and an OBEX server.
Figure 5B:
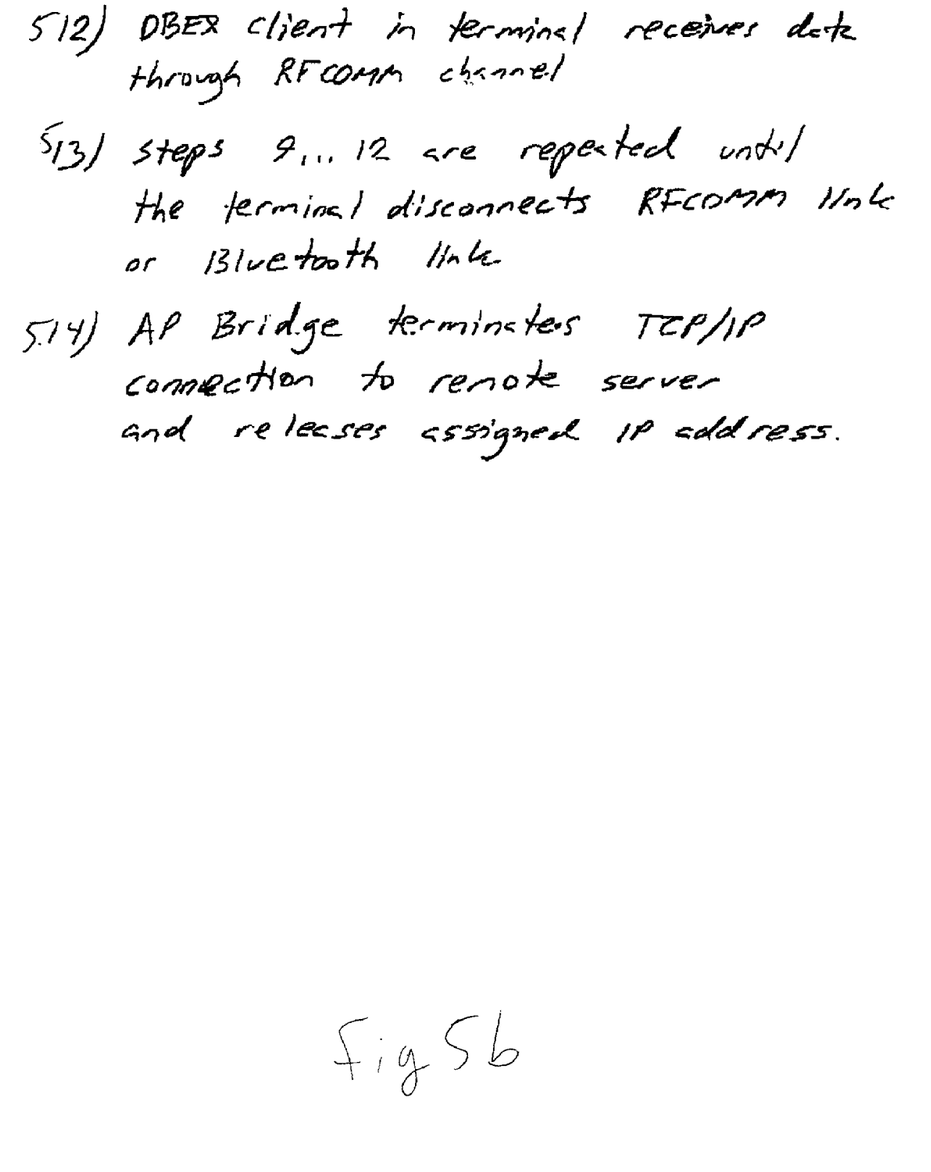

FIG. 5 details a flow diagram of one example communications flow between an OBEX client, OBEX bridge and an OBEX server. Box 501 shows that an OBEX client application 121 is instantiated. The application may be instantiated by invoking commands via an input keyboard or voice or other input means that will cause the client application to be executed by the client's CPU. In one non-limiting example the OBEX client application is instantiated as soon as the client is turned on. Upon this instantiation of the OBEX client application box 502 shows the client sets up a short range RF connection, such as Bluetooth, with the OBEX bridge as has been discussed in FIG. 4.

Box 503 shows that upon establishing the communications between the client and the OBEX bridge application, the client uses the service discovery protocol to inquire about other short range RF device's capabilities and the associated GOEP parameters (in this case the Access Point (AP), i.e., the AP including an OBEX bridge, which contains the bridge application). Box 504 shows that the OBEX application bridge 421 responds using service discovery protocol giving out the parameters needed for the GOEP profile. Box 505 shows the client initiates protocols based on the GOEP profile it received from the server via the OBEX bridge. Box 506 shows that an RFCOMM channel is formed between the client and the OBEX bridge application.

Box 507 shows that upon the formation of an RFCOMM channel between the client and the bridge, the bridge internally assigns an IP address and binds it to a client RFCOMM handle. Box 508 shows that upon generating and associating an internal IP address to the client RFCOMM handle that the OBEX bridge thereafter establishes a TCP/IP connection with the remote OBEX server. Box 509 shows that after the establishment of a TCP/IP connection with the OBEX server, the OBEX client may then begin sending data to the OBEX bridge through the RFCOMM connection. Box 510 shows that the bridge receives data from the client via the RFCOMM connection and encapsulates it into TCP/IP packets. Therefore the OBEX application bridge 421 routes data from the RFCOMM communications 433*b* of the client to the TCP/IP socket in the OBEX bridge. These TCP/IP encapsulated packets are sent to the OBEX bridge's network interface 420*a*. After the OBEX application bridge 421 encodes the data into TCP/IP packets, the data is sent to the OBEX server wherein an OBEX server application 221 will thereafter obtain the data and process the OBEX requests.

Any responses from the OBEX server will be sent back to the bridge via TCP/IP communications through the OBEX server network interface 420b.

Box 511 shows that the responses from the OBEX server 499 that are destined for the OBEX client 401 are received by the OBEX bridge 450 in the corresponding TCP/IP address that was generated by the OBEX bridge. The OBEX bridge uses the bridge table 489 to look up the client RFCOMM handle 487 associated to the client IP address 488 that received the communications from the OBEX server. Next, the bridge encapsulates the data that was received in the form of TCP/IP packets from the OBEX server and routes that data from the TCP/IP socket to the RFCOMM handle. This routing is accomplished by a lookup table that is established upon the creation of an RFCOMM handle as shown in box 507 and in FIG. 4. Thus, the bridge table 489 acts as a routing table to ensure that information flows properly between each client's data request and any respective results from an OBEX server. This is important in an environment where there are multiple OBEX and short range RF enabled clients that are disposed in communications with the OBEX bridge. Thus, upon performing a look up for the correct RFCOMM handle, the TCP/IP information obtained from the OBEX server is encapsulated into RFCOMM packets. The OBEX bridge then sends the RFCOMM encoded data through a wireless Baseband channel back to the client.

Box 512 shows that the client receives the data through the RFCOMM channel. Box 513 shows that boxes 509, 510, 511 and 512 may be repeated until the client disconnects from the RFCOMM link or the short range RF link (e.g., Bluetooth).

Box 514 shows that the bridge terminates the TCP/IP connection to the remote server and releases the assigned IP address.

It should be understood that the above description is only representative of illustrative embodiments. For the convenience of the reader, the above descriptions have focused on a representative sample of all possible embodiments, a sample that teaches the principles of the invention. The description has not attempted to exhaustively enumerate all possible variations. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that the embodiments and variations shown and described herein are merely illustrative of the principles of this invention and that various modifications may be implemented without departing from the scope and spirit of the invention.

What is claimed is:

1. A method of wireless communication between OBEX clients and OBEX server over a communications network, comprising:
   receiving an OBEX encoded communications at a radio frequency enabled OBEX bridge from at least one OBEX client, wherein the OBEX bridge may maintain direct connection communications with a plurality of OBEX clients, and wherein the received OBEX encoded communications arc RFCOMM encoded OBEX communications;
   assigning a unique IP address, which address is internal to the OBEX bridge, to the received RFCOMM encoded OBEX communications, wherein assignment of the unique IP address is performed by the OBEX bridge;
   encapsulating OBEX data requests of the received RFCOMM encoded OBEX communications into TCP/IP packets;
   determining a destination IP address based on and for the OBEX data requests; and
   sending the OBEX data requests from the radio frequency enabled OBEX bridge to an OBEX server at the determined destination IP address via IP, wherein the sent OBEX data requests are of the TCP/IP encapsulated packets, and
   wherein there is no IP connection between the OBEX bridge and the at least one OBEX client.

2. The method of claim 1, wherein the radio frequency enabled OBEX bridge is Bluetooth enabled.

3. The method of claim 1, further comprising:
   receiving OBEX encoded data responses from the OBEX server via IP; and
   routing the OBEX encoded data responses to the OBEX client.

4. A system for wireless communication between OBEX clients and OBEX server over a communications network, comprising:
   means to receive an OBEX encoded communications at a radio frequency enabled OBEX bridge from at least one OBEX client, wherein the OBEX bridge may maintain direct connection communications with a plurality of OBEX clients, and wherein the received OBEX encoded communications are RFCOMM encoded OBEX communications;
   means to assign a unique IP address, which address is internal to the OBEX bridge, to the received RFCOMM encoded OBEX communications, wherein assignment of the unique IP address is performed by the OBEX bridge;
   means to encapsulate OBEX data requests of the received RFCOMM encoded OBEX communications into TCP/IP packets;
   means to determine a destination IP address based on and for the OBEX data requests; and
   means to send the OBEX data requests from the radio frequency enabled OBEX bridge to an OBEX server at the determined destination IP address via IP, wherein the sent OBEX data requests are of the TCP/IP encapsulated packets, and
   wherein there is no IP connection between the OBEX bridge and the at least one OBEX client.

5. The system of claim 4, wherein the radio frequency enabled OBEX bridge is Bluetooth enabled.

6. The system of claim 4, further comprising:
   means to receive OBEX encoded data responses from the OBEX server via IP; and
   means to route the OBEX encoded data responses to the OBEX client.

7. A computer readable medium encoded with a computer program, wherein the computer program comprising:
   a module to receive an OBEX encoded communications at a radio frequency enabled OBEX bridge from at least one OBEX client, wherein the OBEX bridge may maintain direct connection communications with a plurality of OBEX clients, and wherein the received OBEX encoded communications are RFCOMM encoded OBEX communications;
   a module to assign a unique IP address, which address is internal to the OBEX bridge, to the received RFCOMM encoded OBEX communications, wherein assignment of the unique IP address is performed by the OBEX bridge;

a module to encapsulate OBEX data requests of the received RFCOMM encoded OBEX communications into TCP/IP packets;

a module to determine a destination IP address based on and for the OBEX data requests encoded communications; and a module to send the OBEX data requests from the radio frequency enabled OBEX bridge to an OBEX server at the determined destination IP address via IP, wherein the sent data requests are of the TCP/IP encapsulated packets, and wherein there is no IP connection between the OBEX bridge and the at least one OBEX client.

8. The medium of claim 7, wherein the radio frequency enabled OBEX bridge is Bluetooth enabled.

9. The medium of claim 7, further comprising:
a module to receive OBEX encoded data responses from the OBEX server via IP; and
a module to route the OBEX encoded data responses to the OBEX client.

10. An OBEX bridge apparatus, comprising:
a processor;
a memory, communicatively connected to the processor;
a program, stored in the memory,
wherein the program, when executed by the processor, causes the processor to perform:
  receiving an OBEX encoded communications at a radio frequency enabled OBEX bridge from an OBEX client, wherein the OBEX bridge may maintain direct connection communications with a plurality of OBEX clients, and wherein the received OBEX encoded communications are RFCOMM encoded OBEX communications;
  assigning a unique IP address, which address is internal to the OBEX bridge, to the received RFCOMM encoded OBEX communications;
  encapsulating OBEX data requests of the received RFCOMM encoded OBEX communications into TCP/IP packets;
  determining a destination IP address based on and for the OBEX data requests; and
  sending the OBEX data requests from the radio frequency enabled OBEX bridge to an OBEX server at the determined destination IP address via IP, wherein the sent OBEX data requests are of the TCP/IP encapsulated packets, and
  wherein there is no IP connection between the OBEX bridge and the at least one OBEX client.

11. The apparatus of claim 10, wherein the radio frequency enabled OBEX bridge is Bluetooth enabled.

12. The apparatus of claim 10, wherein the program, when executed by the processor, further causes the processor to perform:
receiving OBEX encoded data responses from the OBEX server via IP; and
routing the OBEX encoded data responses to the OBEX client.

13. A method of wireless communication between an OBEX client and OBEX server over a communications network, comprising:
obtaining OBEX encoded communications;
establishing a baseband communication channel using a Bluetooth GOEP profile between the OBEX client and a Bluetooth enabled OBEX bridge, wherein the OBEX bridge may maintain communications with a plurality of OBEX clients;
encapsulating the OBEX encoded communications into baseband communications;
providing the baseband encapsulated communications to the OBEX bridge; assigning an internal IP address within the OBEX bridge, wherein assignment of the internal IP address is performed by the OBEX bridge;
binding the IP address to the baseband communication channel;
establishing a TCP/IP communication channel between the OBEX bridge and a remote OBEX server; and
routing the OBEX encoded data from the baseband channel to the TCP/IP channel,
wherein there is no IP connection between the OBEX bridge and the OBEX client.

14. The method of claim 13, further comprising:
receiving OBEX encoded data responses from the remote server through the TCP/IP channel; and
routing the OBEX encoded data responses to the baseband channel referring to the IP address.

15. A system for wireless communication between an OBEX client and OBEX server over a communications network, comprising:
means to obtain OBEX encoded communications;
means to establish a baseband communication channel using a Bluetooth GOEP profile between the OBEX client and a Bluetooth enabled OBEX bridge, wherein the OBEX bridge may maintain communications with a plurality of OBEX clients;
means to encapsulate the OBEX encoded communications into baseband communications;
means to provide the baseband encapsulated communications to the OBEX bridge;
means to assign an internal IP address within the OBEX bridge, wherein assignment of the internal IP address is performed by the OBEX bridge;
means to bind the IP address to the baseband communication channel;
means to establish a TCP/IP communication channel between the OBEX bridge and a remote OBEX server; and
means to route the OBEX encoded data from the baseband channel to the TCP/IP channel,
wherein there is no IP connection between the OBEX bridge and the OBEX client.

16. The system of claim 15, further comprising:
means to receive OBEX encoded data responses from the remote server through the TCP/IP channel; and
means to route the OBEX encoded data responses to the baseband channel referring to the IP address.

17. A computer readable medium encoded with a computer program, wherein the computer program comprising:
a module to obtain OBEX encoded communications;
a module to establish a baseband communication channel using a Bluetooth GOEP profile between an OBEX client and a Bluetooth enabled OBEX bridge, wherein the OBEX bridge may maintain communications with a plurality of OBEX clients;
a module to encapsulate the OBEX encoded communications into baseband communications;
a module to provide the baseband encapsulated communications to the OBEX bridge;
a module to assign an internal IP address within the OBEX bridge, wherein assignment of the internal IP address is performed by the OBEX bridge;

a module to bind the IP address to the baseband communication channel;
a module to establish a TCP/IP communication channel between the OBEX bridge and a remote OBEX server; and
a module to route the OBEX encoded data from the baseband channel to the TCP/IP channel,
wherein there is no IP connection between the OBEX bridge and the OBEX client.

18. The computer program of claim 17, further comprising:
a module to receive OBEX encoded data responses from the remote server through the TCP/IP channel; and
a module to route the OBEX encoded data responses to the baseband channel referring to the IP address.

19. An OBEX bridge apparatus, comprising:
a processor;
a memory, communicatively connected to the processor;
a program, stored in the memory,
wherein the program, when executed by the processor, causes the processor to perform:
obtaining OBEX encoded communications;
establishing a baseband communication channel using a Bluetooth GOEP profile between the OBEX client and a Bluetooth enabled OBEX bridge, wherein the OBEX bridge may maintain communications with a plurality of OBEX clients;
encapsulating the OBEX encoded communications into baseband communications;
providing the baseband encapsulated communications to the OBEX bridge;
assigning an internal IP address within the OBEX bridge;
binding the IP address to the baseband communication channel;
establishing a TCP/IP communication channel between the OBEX bridge and a remote OBEX server; and
routing the OBEX encoded data from the baseband channel to the TCP/IP channel,
wherein there is no IP connection between the OBEX bridge and the OBEX client.

20. The apparatus of claim 19, wherein the program, when executed by the processor, further causes the processor to perform:
receiving OBEX encoded data responses from the remote server through the TCP/IP channel; and
routing the OBEX encoded data responses to the baseband channel referring to the IP address.

21. A method of creating a data structure binding an IP address to an RFCOMM communication channel, comprising:
creating a client baseband handle referring to a memory space in an OBEX bridge's memory for incoming baseband communications, wherein the OBEX bridge may maintain communications with a plurality of OBEX clients;
creating an internal IP address within the OBEX bridge allowing for communications to flow to and from a communications network through the IP address, wherein creation of the internal IP address is performed by the OBEX bridge;
creating an entry in the memory to store the client baseband handle data type;
creating an entry in the memory to store the IP address data type;
binding the client baseband handle data type with its respective IP address data type,
wherein there is no IP connection between the OBEX bridge and the clients.

22. A system for creating a data structure binding an IP address to an RFCOMM communication channel, comprising:
means to create a client baseband handle referring to a memory space in an OBEX bridge's memory for incoming baseband communications, wherein the OBEX bridge may maintain communications with a plurality of OBEX clients;
means to create an internal IP address within the OBEX bridge allowing for communications to flow to and from a communications network through the IP address, wherein creation of the internal IP address is performed by the OBEX bridge;
means to create an entry in the memory to store the client baseband handle data type;
means to create an entry in the memory to store the IP address data type;
means to bind the client baseband handle data type with its respective IP address data type,
wherein there is no IP connection between the OBEX bridge and the clients.

23. A computer readable medium encoded with a computer program, wherein the computer comprising:
a module to create a client baseband handle referring to a memory space in an OBEX bridge's memory for incoming baseband communications, wherein the OBEX bridge may maintain communications with a plurality of OBEX clients;
a module to create an internal IP address within the OBEX bridge allowing for communications to flow to and from a communications network through the IP address, wherein creation of the internal IP address is performed by the OBEX bridge;
a module to create an entry in the memory to store the client baseband handle data type;
a module to create an entry in the memory to store the IP address data type;
a module to bind the client baseband handle data type with its respective IP address data type,
wherein there is no IP connection between the OBEX bridge and the clients.

24. An OBEX bridge apparatus, comprising:
a processor;
a memory, communicatively connected to the processor;
a program, stored in the memory,
wherein the program, when executed by the processor, causes the processor to perform:
creating a client baseband handle referring to a memory space in an OBEX bridge's memory for incoming baseband communications, wherein the OBEX bridge may maintain communications with a plurality of OBEX clients;
creating an internal IP address within the OBEX bridge allowing for communications to flow to and from a communications network through the IP address;
creating an entry in the memory to store the client baseband handle data type;
creating an entry in the memory to store the IP address data type;
binding the client baseband handle data type with its respective IP address data type,
wherein there is no IP connection between the OBEX bridge and the client.

25. A method of wireless communication between an OBEX client and an OBEX server over a communications network, comprising:
- receiving at an OBEX bridge OBEX encoded communications transmitted from the OBEX client via a short range radio link wherein the OBEX bridge may maintain communications with a plurality of OBEX clients;
- allocating an internal address to the OBEX client at the OBEX bridge, wherein allocation of the internal address is performed by the OBEX bridge;
- associating the OBEX client with the allocated internal address at the OBEX bridge;
- selecting, based on and for the received OBEX encoded communications, a certain OBEX server at the OBEX bridge to send the received OBEX encoded communications;
- determining a destination IP address of the selected OBEX server;
- sending the received OBEX encoded communications from the OBEX bridge to the selected OBEX server via IP,
  - wherein there is no IP connection between the OBEX bridge and the OBEX client.

26. The method of claim 25, further comprising:
- receiving OBEX encoded data responses from the selected OBEX server via IP;
- routing the OBEX encoded data response at the OBEX bridge using said association;
- transmitting the OBEX encoded data responses to the OBEX client via the short range radio link.

27. The method of claim 25, wherein the short range radio link is a Bluetooth link.

28. A system for wireless communication between an OBEX client and an OBEX server over a communications network, comprising:
- means to receive at an OBEX bridge OBEX encoded communications transmitted from the OBEX client via short range radio link, wherein the OBEX bridge may maintain communications with a plurality of OBEX clients;
- means to allocate an internal address to the OBEX client at the OBEX bridge, wherein allocation of the internal address is performed by the OBEX bridge;
- means to associate the OBEX client with the allocated internal address at the OBEX bridge;
- means to select, based on and for the received OBEX encoded communications, a certain OBEX server at the OBEX bridge to send the received OBEX encoded communications;
- means to determine a destination IP address of the selected OBEX server;
- means to send the received OBEX encoded communications from the OBEX bridge to the selected OBEX server via IP,
  - wherein there is no IP connection between the OBEX bridge and the OBEX client.

29. The system of claim 28, further comprising:
- means to receive OBEX encoded data responses from the selected OBEX server via IP;
- means to rout the OBEX encoded data response at the OBEX bridge using said association;
- means to transmit the OBEX encoded data responses to the OBEX client via short range radio link.

30. The system of claim 28, wherein the short range radio link is a Bluetooth link.

31. A computer readable medium encoded with a computer program, wherein the computer comprising:
- a module to receive at an OBEX bridge OBEX encoded communications transmitted from an OBEX client via short range radio link wherein the OBEX bridge may maintain communications with a plurality of OBEX clients;
- a module to allocate an internal address to the OBEX client at the OBEX bridge, wherein allocation of the internal address is performed by the OBEX bridge;
- a module to associate the OBEX client with the allocated internal address at the OBEX bridge;
- a module to select, based on and for the received OBEX encoded communications, a certain OBEX server at the OBEX bridge to send the received OBEX encoded communications;
- a module to determine a destination IP address of the selected OBEX server;
- a module to send the received OBEX encoded communications from the OBEX bridge to the selected OBEX server via IP,
- wherein there is no IP connection between the OBEX bridge and the OBEX client.

32. The computer program of claim 31, further comprising:
- a module to receive OBEX encoded data responses from the selected OBEX server via IP;
- a module to rout the OBEX encoded data response at the OBEX bridge using said association;
- a module to transmit the OBEX encoded data responses to the OBEX client via short range radio link.

33. The computer program of claim 31, wherein the short range radio link is a Bluetooth link.

34. An OBEX bridge apparatus, comprising:
- a processor;
- a memory, communicatively connected to the processor;
- a program, stored in the memory,
- wherein the program, when executed by the processor, causes the processor to perform:
  - receiving at an OBEX bridge OBEX encoded communications transmitted from an OBEX client via short range radio link wherein the OBEX bridge may maintain communications with a plurality of OBEX clients;
  - allocating an internal address to the OBEX client at the OBEX bridge;
  - associating the OBEX client with the allocated internal address at the OBEX bridge;
  - selecting, based on and for the received OBEX encoded communications, a certain OBEX server at the OBEX bridge to send the received OBEX encoded communications;
  - determining a destination IP address of the selected OBEX server;
  - sending the received OBEX encoded communications from the OBEX bridge to the selected OBEX server via IP,
    - wherein there is no IP connection between the OBEX bridge and the OBEX client.

35. The apparatus of claim 34, wherein the program, when executed by the processor, further causes the processor to perform:
- receiving OBEX encoded data responses from the selected OBEX server via IP;
- routing the OBEX encoded data response at the OBEX bridge using said association;
- transmitting the OBEX encoded data responses to the OBEX client via short range radio link.

36. The apparatus of claim 34, wherein the short range radio link is a Bluetooth link.

* * * * *